(No Model,)
L. S. CRITTENDEN.
WAGON RUNNING GEAR.
No. 502,282.      Patented Aug. 1, 1893.
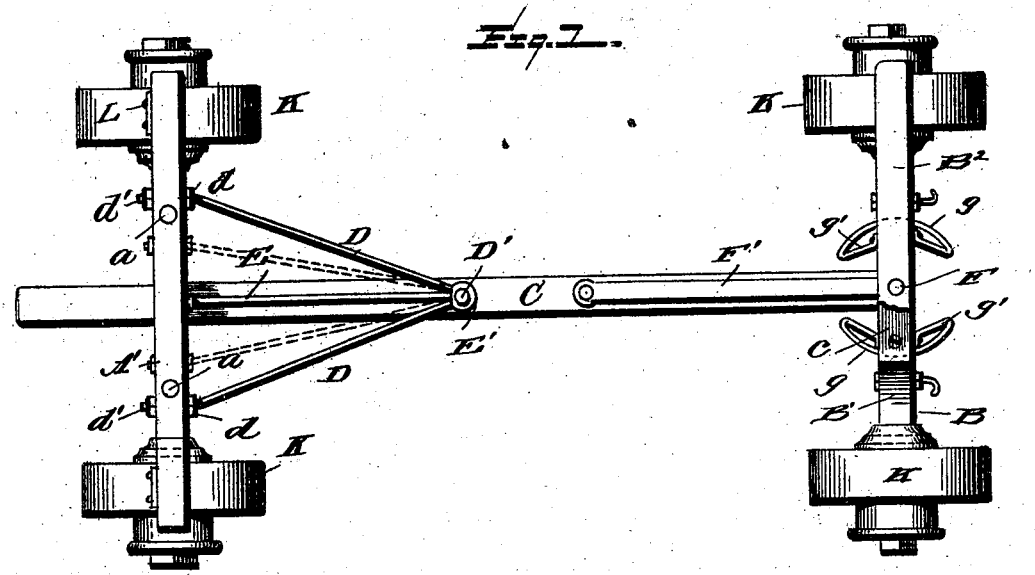
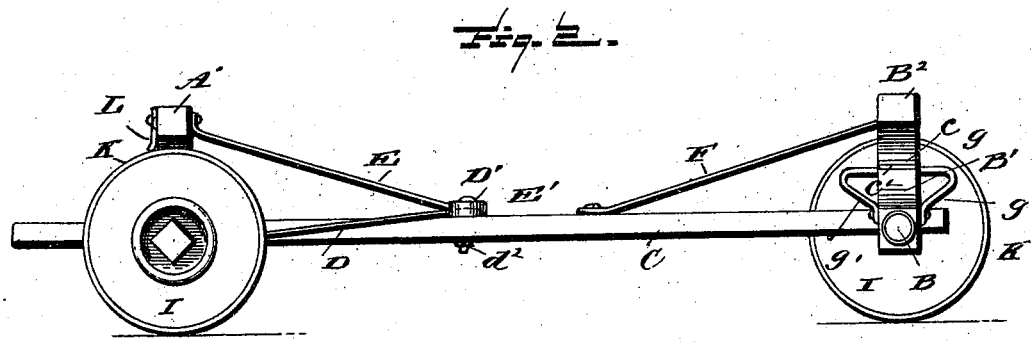
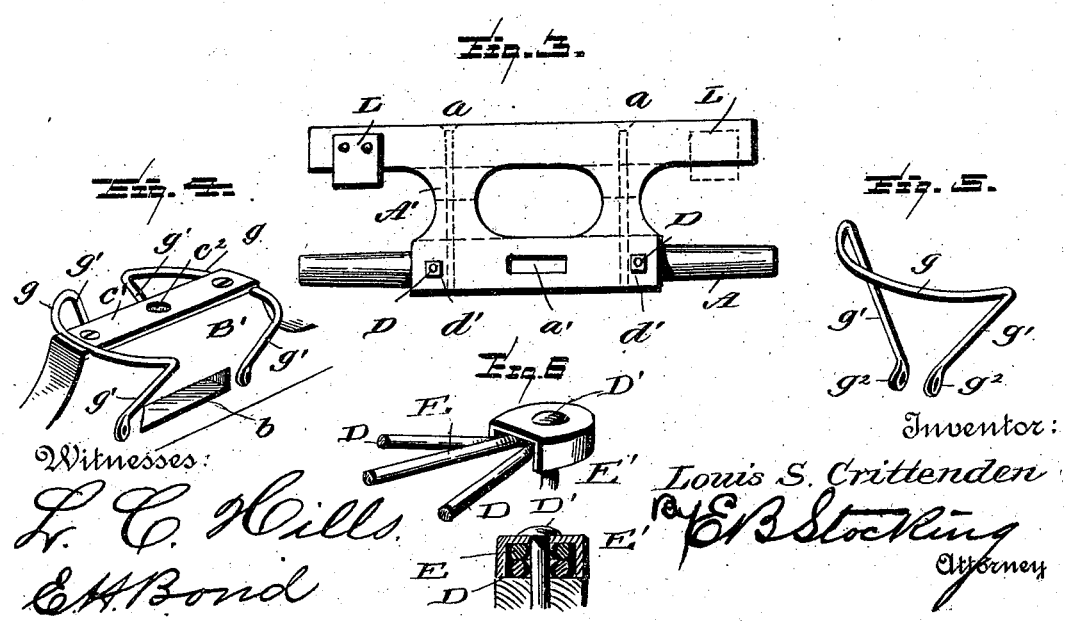
Witnesses:
L. C. Hills
E. H. Bond
Inventor:
Louis S. Crittenden
by E. B. Stocking
Attorney

UNITED STATES PATENT OFFICE.

LOUIS S. CRITTENDEN, OF HORNELLSVILLE, NEW YORK.

WAGON RUNNING-GEAR.

SPECIFICATION forming part of Letters Patent No. 502,282, dated August 1, 1893.

Application filed March 16, 1893. Serial No. 466,328. (No model.)

*To all whom it may concern:*

Be it known that I, LOUIS S. CRITTENDEN, a citizen of the United States, residing at Hornellsville, in the county of Steuben and State of New York, have invented certain new and useful Improvements in Wagons, of which the following is a specification, reference being had therein to the accompanying drawings.

This invention relates to certain new and useful improvements in farm wagons and it has for its objects among others to provide a strong and durable yet simple farm wagon adapted especially for use upon soft or marshy ground. I provide a scraper for the wheels to keep the same free from adhering mud which often interferes with the revolution of the wheels. I provide a novel form of brace for the hind axle and a cap for the securing means of said braces. The fifth wheel is formed of two pieces of sufficiently strong, substantially round metal held to the front bolster and shaped to constitute each one half of the wheel. The wagon as a whole is complete and serviceable. Parts may be employed without the whole; parts, the wheels for instance, may be employed with parts constructed otherwise than hereinafter set forth. The fifth wheel is adapted for use upon any wagon regardless of the construction of the other elements; each or all of these parts are capable of co-operation with a different construction of the others.

Other objects and advantages of the invention will hereinafter appear and the novel features thereof will be specifically defined by the appended claims.

The invention is clearly illustrated in the accompanying drawings, which, with the letters of reference marked thereon form a part of this specification, and in which—

Figure 1 is a top plan of my improved wagon with a portion broken away. Fig. 2 is a side elevation thereof with one of the wheels removed. Fig. 3 is a rear view of the rear bolster and axle. Fig. 4 is a perspective view of the front bolster and axle showing the fifth wheel in place. Fig. 5 is a perspective view of one half of the fifth wheel removed. Fig. 6 shows in enlarged perspective detail and vertical section the cap over the eyes of the braces.

Like letters indicate like parts throughout the several views.

Referring now to the details of the drawings by letter A designates the rear axle carrying the rear bolster A' which may be integral with the axle, as indicated by full lines in Fig. 3, or it may be formed in two, three or four parts as indicated by dotted lines in said Fig. 3. When formed of two or more pieces the same will be rigidly secured together as by bolts $a$. These bolts may also be present if the bolster be made of one piece, to strengthen the same.

B is the front axle carrying the front bolster B' which may be integral therewith and is provided with an opening $b$ therethrough as seen best in Fig. 4 for the passage of the reach C, the said opening being somewhat larger than the end of the reach so as to permit the latter to work therein on its pivot.

The rear end of the reach passes through an opening $a'$ in the rear bolster and is held rigidly to the rear axle and bolster in the following manner:

D is a brace the rear ends of which are screwthreaded and pass through the rear axle and are provided with nuts $d$ and $d'$, one upon each side of the axle and at its center it is formed with a loop or eye through which passes the vertical bolt D' which secures it to the reach. The arms of this brace extend in an inclined direction as seen in Fig. 1 with their rear ends bent at an angle to their length so as to pass straight through the axle.

E is another brace secured at its rear end to the bolster A' and its front end formed with a loop or eye resting either upon the eye or loop of the brace D or fitted therein and held in place upon the reach by the same bolt D' that secures the said brace D in position. The eyes or loops of the two braces are covered by a metallic cap E' the rear portion of which has an opening for the passage of the braces and this cap is held in position over the said eyes or loops by the bolt D' which thus serves to hold all of said parts rigidly in their places. Instead of the brace E being a single arm as shown by full lines it may be a branched one like the brace D with its arms arranged in the same or a different vertical plane with the arms of the brace D being provided with an eye or loop held in the same manner as if it were a single arm.

$B^2$ is the head block mounted upon the front bolster and F is the king bolt passed through the head block and bolster and through the front end of the reach.

F' is a brace secured at one end to the reach and at its other passes into a hole in the head block and has the king bolt passed therethrough.

The upper face of the front bolster is provided with a metal wear plate $c$ and the under face of the head block is provided with a similar wear plate $c'$ through each of which is a hole $c^2$ for the passage of the king bolt.
The bolt D has upon its lower end a nut $d^3$ as seen in Fig. 2.

In constructing the fifth wheel I take two like pieces of metal, as wire, of sufficient size and bend each to form a curved portion $g$ and the inclined arms $g'$ the ends of which are flattened and perforated or formed with eyes or loops to form openings $g^2$ for the reception of bolts or other means by which they are secured to the front bolster.
These two parts are secured to the front bolster as seen in Fig. 4 with the curved portions arranged outwardly as seen, and these curved portions may be confined in a groove beneath the wear plate $c$ as seen at the right of Fig. 4, or they may be located in a groove at the end of the plate, or rest in a groove in the body of the plate itself as seen at the left of said Fig. 4. This forms a cheap and durable fifth wheel and one that can be readily applied. The arms $g'$ of the fifth wheel may be arranged at different angles if desired and they may also be of any desired length.

The wheels I are small in diameter with a very broad tread to adapt them for use upon soft ground and are mounted upon the axles in any well known manner.

L are scrapers arranged to remove the mud and dirt from the wheels; they are of any desired shape and are secured to the rear of the bolster in any suitable maner.

Modifications in detail may be resorted to without departing from the spirit of the invention or sacrificing any of its advantages.

What I claim is—

1. The combination with the rear axle and bolster and the reach, of the inclined braces having an opening through which said braces pass secured to the bolster and a cap over the forward ends of the braces and all held by a single bolt, substantially as specified.

2. The combination with the rear axle and bolster, and the reach, of the inclined braces of a single piece with an eye, the brace connecting the reach and bolster and formed with an eye, the cap over the eyes of the braces, and a single bolt passed through the cap, eyes and reach, substantially as shown and described.

3. The combination with the rear axle and bolster and the reach, of the diverging brace arms formed with an eye and having their rear ends passed through the bolster, nuts on the said arms upon opposite sides of the bolster, the additional brace secured to the bolster and having an eye, a cap covering the eyes of said braces and a single bolt passed through the cap, eyes and reach and provided with an adjusting nut, substantially as specified.

4. A fifth wheel comprising two like parts each embodying a horizontally outwardly curved bearing surface and integral supporting portions at the ends thereof at an angle thereto and converging toward each other, and a wear plate on the top of the bolster engaging the curved portions of the fifth wheel as set forth.

5. The combination with the front axle and bolster, of a fifth wheel having two like parts each with a horizontally outwardly curved bearing surface supported upon the top of the bolster, and end portions secured to opposite sides and ends of the bolster, and a wear plate on the top of the bolster having grooves for the reception of and serving to hold the curved portions, as set forth.

In testimony whereof I affix my signature in presence of two witnesses.

LOUIS S. CRITTENDEN.

Witnesses:
S. J. BAILY,
BYRON A. BAILY.